US006893250B2

(12) United States Patent
Meschia et al.

(10) Patent No.: US 6,893,250 B2
(45) Date of Patent: May 17, 2005

(54) MOULD CLOSING AND CLAMPING SYSTEM FOR AN INJECTION MOULDING MACHINE

(75) Inventors: Maurilio Meschia, Usmate (IT); Romano Castelli, Rho (IT)

(73) Assignee: Negri Bossi SpA, Milan (IT)

( * ) Notice: Subject to any disclaimer, the term of this patent is extended or adjusted under 35 U.S.C. 154(b) by 154 days.

(21) Appl. No.: 10/440,106

(22) Filed: May 19, 2003

(65) Prior Publication Data

US 2003/0228391 A1 Dec. 11, 2003

(30) Foreign Application Priority Data

Jun. 6, 2002 (EP) .......................................... 02425371

(51) Int. Cl.⁷ .......................................... B29C 45/64
(52) U.S. Cl. ..................................................... 425/595
(58) Field of Search ................................ 425/589, 595, 425/450.1, 451.9

(56) References Cited

U.S. PATENT DOCUMENTS

| | | | | |
|---|---|---|---|---|
| 2,976,569 A | * | 3/1961 | Quere et al. ................. | 425/590 |
| 3,606,641 A | * | 9/1971 | Carrieri et al. ............. | 425/595 |
| 3,801,256 A | * | 4/1974 | Farrell ......................... | 425/595 |
| 4,504,208 A | * | 3/1985 | Kurumaji et al. ........... | 425/595 |
| 5,320,517 A | * | 6/1994 | Hirata et al. ................ | 425/595 |
| 5,620,723 A | * | 4/1997 | Glaesener et al. .......... | 425/595 |
| 5,714,180 A | * | 2/1998 | Lampl et al. ................ | 425/595 |
| 6,524,091 B2 | * | 2/2003 | Romi .......................... | 425/595 |
| 6,733,275 B2 | * | 5/2004 | Fujita ......................... | 425/595 |

* cited by examiner

*Primary Examiner*—James P. Mackey
(74) *Attorney, Agent, or Firm*—Nixon & Vanderhye, PC; Frank P. Presta

(57) ABSTRACT

An injection molding machine (1) comprising a fixed mold half (4) mounted on a fixed plate (3) integral with the machine frame (2) and a moveable mold half (9) mounted on a moveable plate (8) supported in translation on the machine frame (2) and guided along guide columns (5) integral with the fixed plate (3), to pass from a mold closing position to a mold opening position, and a closing and clamping system (10) comprising clamping means, integral with the moveable plate (8) and acting on a portion of the guide columns (5) to lock the moveable plate (8) in the closing position. The clamping means comprise a plurality of locking inserts (22) mounted slidably within seats (21) of a body (13) integral with the moveable plate (8) to pass from a non clamping position to a clamping position in which they act, in a locking relationship, on the guide columns (5), each locking insert (22) having a circular hole (25) to receive an eccentric shaft (26) in an eccentric position, so that rotation of the eccentric shaft (26) causes translation of the insert (22), drive means being provided such as to set the eccentric shafts (26) in rotation synchronously to allow opening/closing of the clamping means.

10 Claims, 7 Drawing Sheets

MOULD CLOSING AND CLAMPING SYSTEM FOR AN INJECTION MOULDING MACHINE

DESCRIPTION

The present invention refers to a closing and clamping system for an injection moulding machine.

As is known, an injection moulding machine generally comprises a pair of mould halves cooperating with each other so as to give rise to a cavity into which the plastic material for formation of the moulded product is injected. One mould half is mounted on a fixed plate integral with the machine frame and the other mould half is mounted on a moveable plate translating on the frame of the moulding machine and guided on guide columns. In this manner the moveable plate is made to translate from a position of closure wherein the two mould halves are coupled together for injection of the plastic material to an opening position wherein the two mould halves are spaced apart from each other for ejection of the moulded product.

When the moveable plate is in the position of closure, a closing and clamping system of the moulding machine acts on the moveable plate, locking it firmly into position, so as to overcome the force of expansion of the plastic material injected into the cavity defined between the two mould halves.

Two different closing and clamping systems for injection moulding machines are currently widely available on the market, that is to say the closing system of the type with shell halves and the closing system of the bayonet type.

In European patent application EP 0.720.525 a closing and clamping system of the type with shell halves for injection moulding machines is disclosed, wherein serrated jaws in the form of shell halves which act on a matching toothing provided in a portion of each guide column of the moveable plate, so as to lock the moveable plate in a position of closure, are mounted on the moveable plate of the mould half. To be precise, a pair of opposed jaws driven in an opposite linear movement by respective cylinders and hydraulic pistons act on each guide column. These jaws are shaped like a semi-cylindrical shell half, and for this reason, the disengagement stroke of the teeth of the columns is about 3–4 times the depth of the tooth.

Such a closing system with shell halves, though not involving particular difficulties of mechanical processing of the shell halves and the hydraulic piston, presents some drawbacks.

In fact the half shells and the hydraulic pistons are separate from each other and this leads to an excessive bulk with the result to provide excessively long guide columns.

Furthermore, the closing movement of the two shell halves driven by the hydraulic pistons cannot easily be synchronised and this leads to touching on the guide column first of one shell half and then of the other, giving rise to asymmetrical lateral forces. The synchronism of closing on the four columns is extremely difficult, and for this reason closing is generally synchronised only on two guide columns.

In European patent applications EP 0 841.143 and EP 0.976.521 a closing and clamping system of the bayonet type for injection moulding machines is disclosed.

In EP 0.841.143 an injection moulding machine is described wherein locking pistons which act on the respective guide columns to lock the moveable plate are mounted in the moveable mould plate. Each locking piston is shaped like a nut with an internal toothing which engages on an external toothing provided in a portion of the respective guide column. The locking piston is driven in rotation, so that with a rotation of about 45° it can pass from the releasing position to the locking position, in a bayonet type coupling relationship.

In EP 0.976.521 an injection moulding machine is described wherein a locking column is mounted in the moveable plate of the moulding machine and a clamping block is mounted integrally on the frame of the moulding machine. A locking piston in the shape of a nut with an internal toothing that acts on an external toothing of the locking column to lock the moveable plate in position is mounted in the clamping block. In this case also the locking piston is driven in rotation, in a bayonet coupling relationship.

This solution with the bayonet system integrated into the hydraulic piston overcomes the drawbacks due to the bulk, allows synchronism on the four guide columns to be achieved easily and does not present the possibility of asymmetrical lateral thrusts on the columns. Nevertheless, the bayonet system presents the substantial drawback that to create the alternation of the toothing on the column and on the rotating piston extremely precise and costly mechanical processing is necessary.

Furthermore, in the bayonet system, problems arise with the seal of the hydraulic piston, which must perform a dual function for axial movement and for rotating movement.

The object of the present invention is to overcome the drawbacks of the prior art by providing a closing and clamping system for injection moulding machines that is extremely efficient and at the same time economical and easy to make.

Another object of the present invention is to provide such a closing and clamping system for an injection moulding machine that is versatile, can be applied to various types of moulding machines and at the same time is not bulky.

Another object of the present invention is to provide such a closing and clamping system for an injection moulding machine that is able to act synchronously on the guide columns of the moulding machine.

These objects are achieved in accordance with the invention with the characteristics listed in appended independent claim 1.

Advantageous embodiments of the invention are apparent from the dependent claims.

An injection moulding machine comprises a fixed mould half mounted on a fixed plate integral with the machine frame and a moveable mould half mounted on a moveable plate supported in translation on the machine frame. The moveable plate is guided along guide columns integral with the fixed plate, to pass from a mould closing position wherein the two mould halves are coupled together defining a cavity for injection of the plastic material to a mould opening position wherein the two half moulds are spaced apart from each other to allow ejection of the moulded product.

According to the invention, the machine provides a closing and clamping system comprising clamping means, integral with the moveable plate and acting on a portion of the guide columns to lock the moveable plate in position, when it is in the mould closing position. The peculiarity of the invention is represented by the fact that the clamping means comprise a plurality of locking or clamping inserts slidably mounted within seats of a body integral with the moveable plate to pass from a non-clamping position to a clamping position wherein the locking inserts act, in a locking relationship, on the guide columns.

Each locking inset has a circular hole to receive, in an eccentric position, an eccentric shaft, so that rotation of the eccentric shaft causes translation of the respective locking insert. Drive means are provided for the closing and clamping system according to the invention, suitable to set the eccentric shafts in rotation in a synchronous manner to allow opening/closing of the clamping inserts.

It is obvious that the closing and clamping system according to the invention holds advantages.

In fact, said system occupies little space, allows easy and convenient synchronism of closing on the four guide columns, does not cause problems of imbalance of asymmetrical lateral forces on the columns and does not require excessively complex mechanical processing on the guide columns and on the locking inserts.

Further characteristics of the invention will be made clearer by the detailed description that follows, referring to purely exemplary and therefore non-limiting embodiment thereof, illustrated in the appended drawings, wherein.

The closing and clamping system for injection moulding machines according to the invention is described with the aid of the figures.

Figure 1:
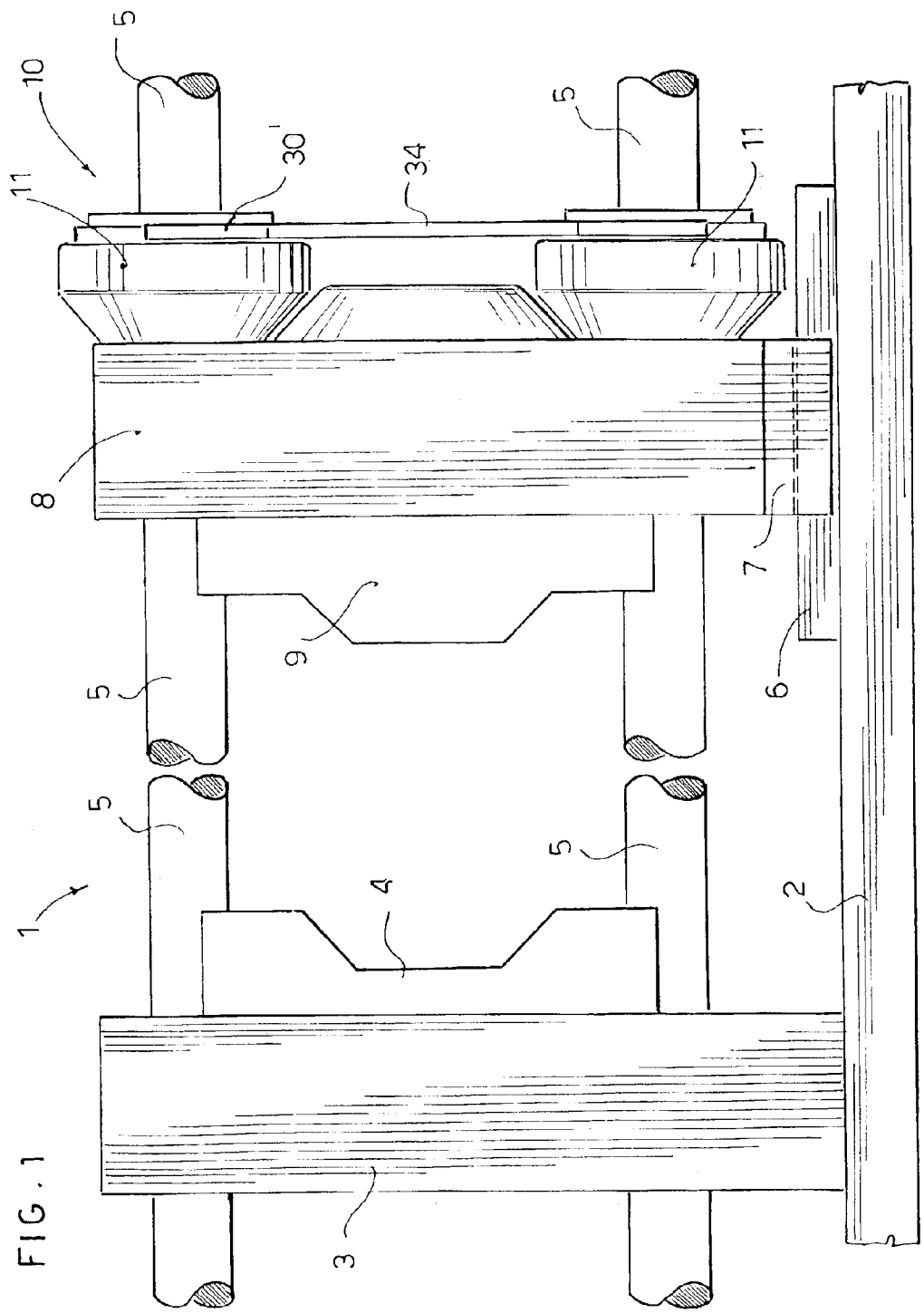
FIG. 1 is an elevational side view, partially broken off, diagrammatically illustrating an injection moulding machine according to the invention.

FIG. 1 shows an injection moulding machine designated as a whole with reference numeral 1. The machine 1 comprises a basic frame 2 mounted fixedly on the ground. A fixed plate 3 which supports a fixed mould half 4 is mounted on the basic frame.

Figure 2:
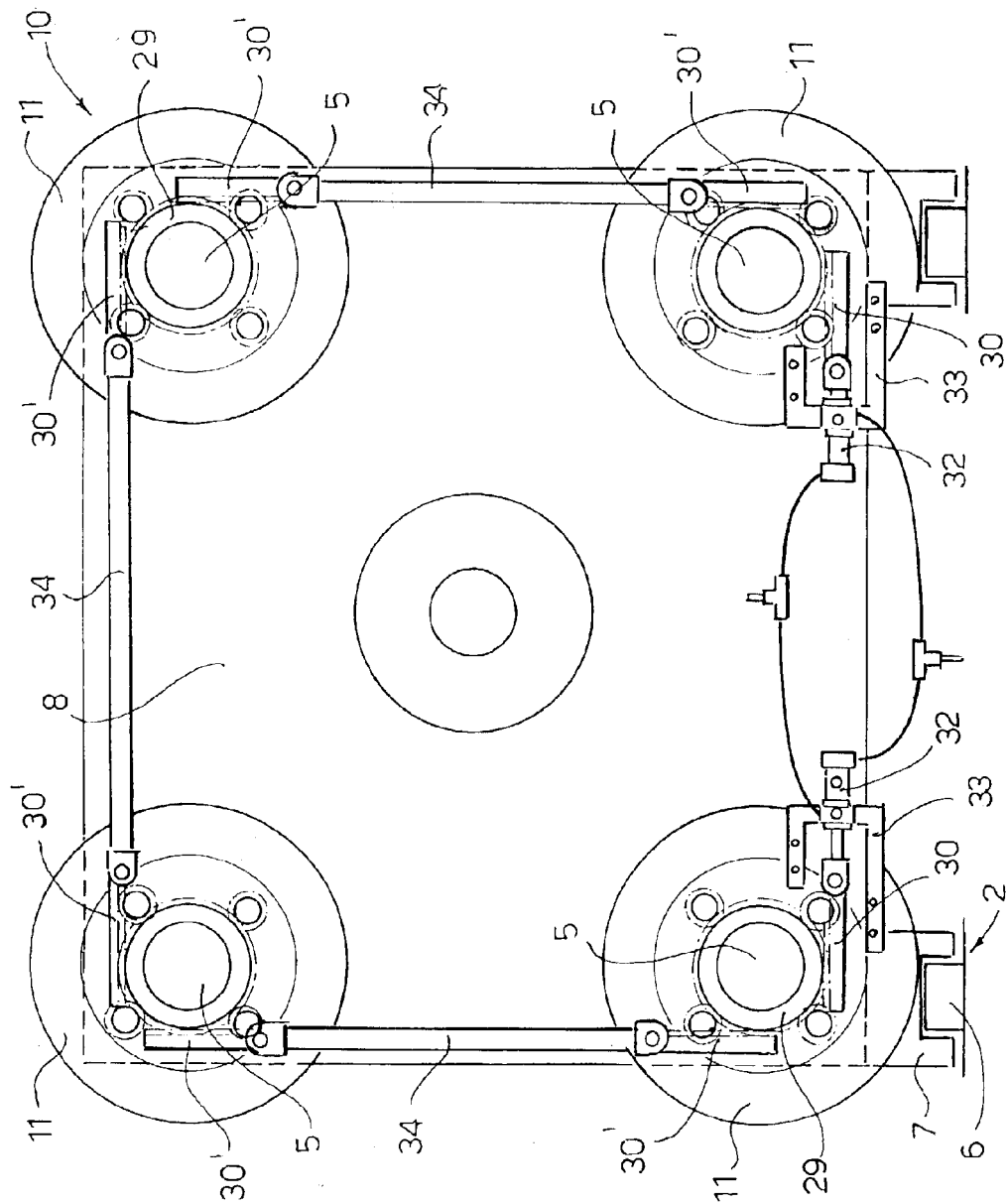
FIG. 2 is a rear view, taken from the right in FIG. 1, illustrating the kinematics of the closing and clamping system of the injection moulding machine according to the invention.

As shown also in FIG. 2, two guide tracks 6, whereon two slides 7 integral with a moveable plate 8 supporting a moveable mould half 9, are mounted on the basic frame 2. Four horizontal guide columns 5 disposed outside the fixed mould half 4 at the four corners of a square or a rectangle are mounted integrally in the fixed plate 3. The guide columns 5 pass through the moveable plate 8 acting as guides therefor. In this manner the moveable plate 8 can translate horizontally supported by the slides 7 and guided by the guide columns 5, passing from an open mould position wherein the two mould halves 4 and 9 are spaced apart from each other to a closed mould position wherein the two mould halves 4 and 9 are coupled together so as to define a cavity into which the plastic material is injected.

Behind the moveable plate 8, that is to say on the opposite side to that wherein the moveable mould 9 is mounted, a closing and clamping system according to the invention, designated as a whole with reference numeral 10 is mounted. Said closing and clamping system 10 comprises four locking cylinders 11 mounted integrally on the moveable plate 8 and acting respectively on the four guide columns 5, when the mobile plate 8 is in the mould closing position, so as to lock the moveable plate 8 to avoid movement thereof during injection and expansion of the plastic material in the mould cavity.

Figure 4:
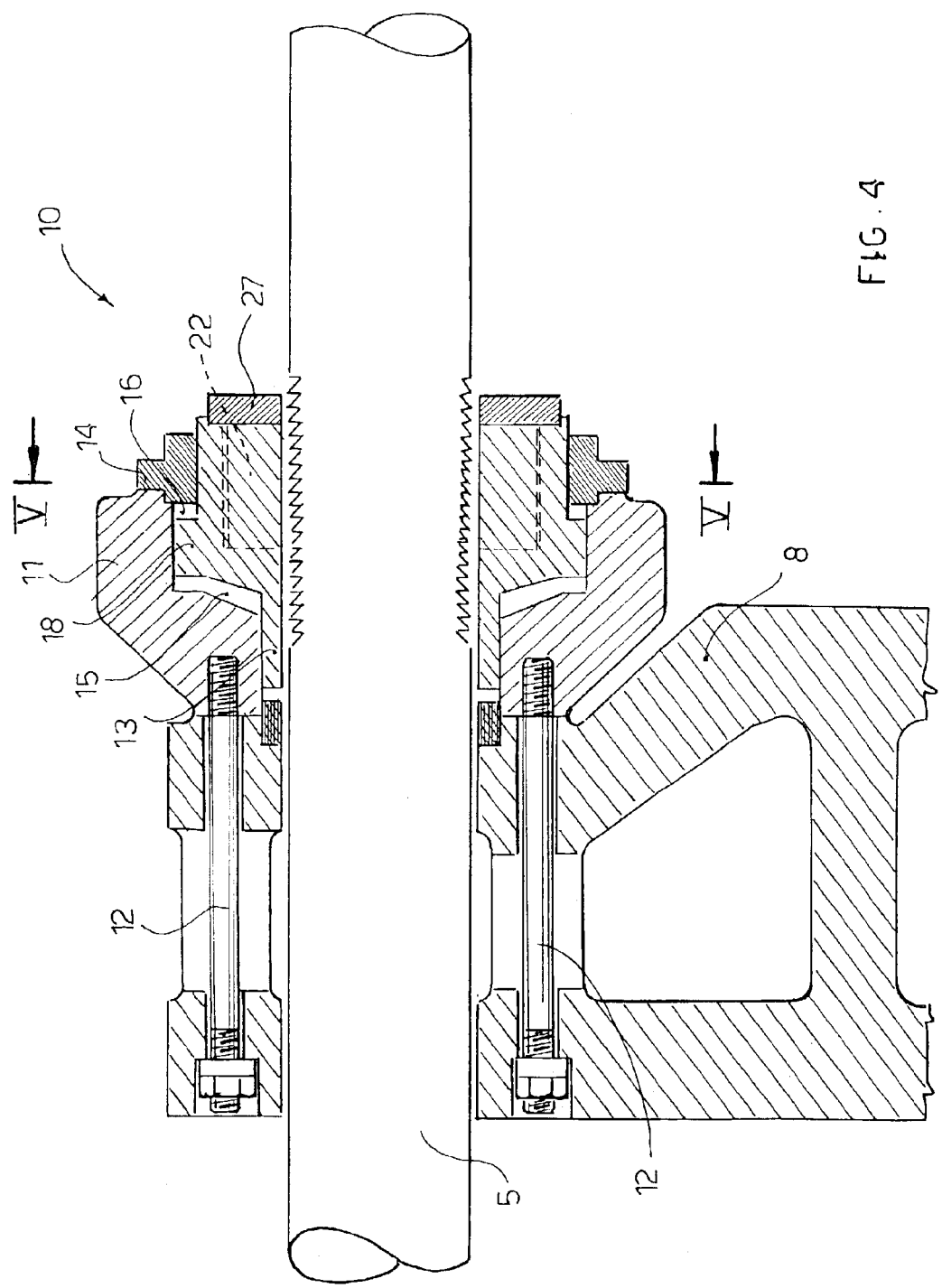
FIG. 4 is an axial sectional view taken along the axis of a guide column of the moulding machine, illustrating the closing and clamping system according to the invention, wherein the supporting plate of the moveable mould is shown broken off and the guide column is not sectioned.

As shown in FIG. 4, each locking cylinder 11 is fixed by means of screw means 12 to the moveable plate 8 and each of the guide columns 5 passes through the moveable plate 8 and the respective locking cylinder 11 to protrude rearward from the locking cylinder 11.

Inside the locking cylinder 11 a locking piston 13 having an axial hole for passage of the guide columns 5 is mounted slidably. Thus, the locking piston 13 can slide horizontally along an axis coinciding with the axis of the guide column 5.

The locking cylinder 11 is closed at the rear by an annular closing plate 14 integral with the locking cylinder 11 and disposed around the locking piston 13. The locking piston 13 has a portion 18 with a greater diameter so as to define two separate chambers 15 and 16 within the locking cylinder 11, that is to say a front locking chamber 15 between the inner wall of the locking cylinder 11 and the front wall of the larger diameter part 18 of the locking piston 13 and a rear releasing chamber 16 between the rear wall of the larger diameter part 18 of the locking piston 13 and the closing plate 14.

Figure 6:
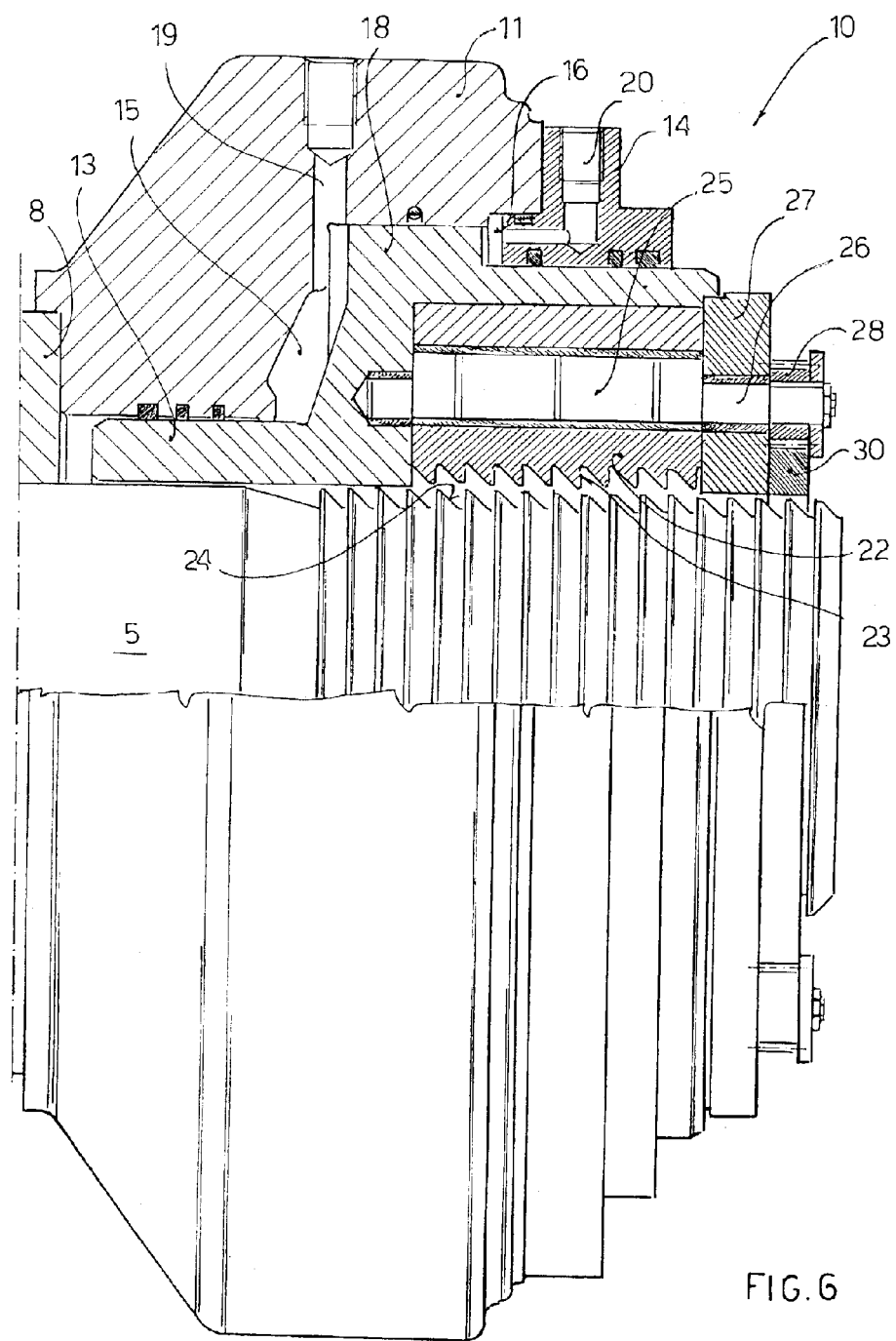
FIG. 6 is a view partially in axial section taken along the sectional plane VI—VI of FIG. 5.

As shown in FIG. 6, the front locking chamber 15 is in communication with a duct 19 formed in the locking cylinder 11 for feeding in pressurised oil and the rear releasing chamber 16 is in communication with a duct 20 formed in the closing plate 14 of the locking cylinder for feeding in pressurised oil. In this manner, by pressurising the front locking chamber 15, the piston 13 makes a horizontal stroke from left to right (with reference to FIG. 6), whilst by pressurising the rear releasing chamber 16, the piston 13 makes a horizontal stroke from right to left (with reference to FIG. 6).

Figure 7:
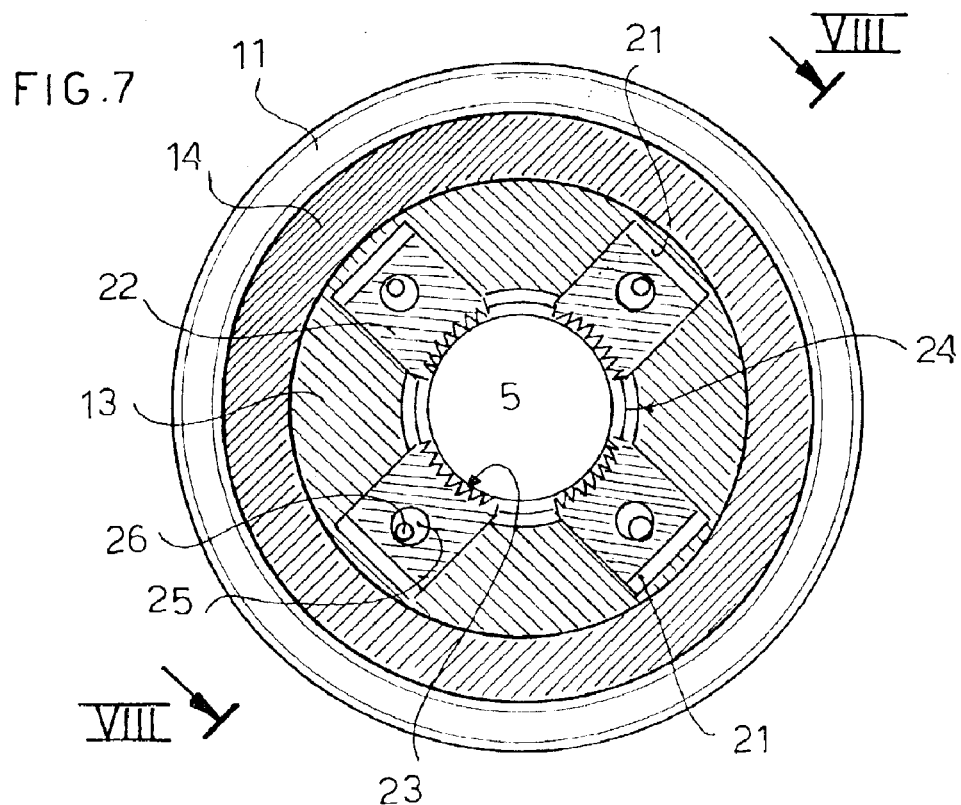
FIG. 7 is cross sectional view, like FIG. 5, but illustrating the four inserts of the locking system in a closed position of clamping.
Figure 5:
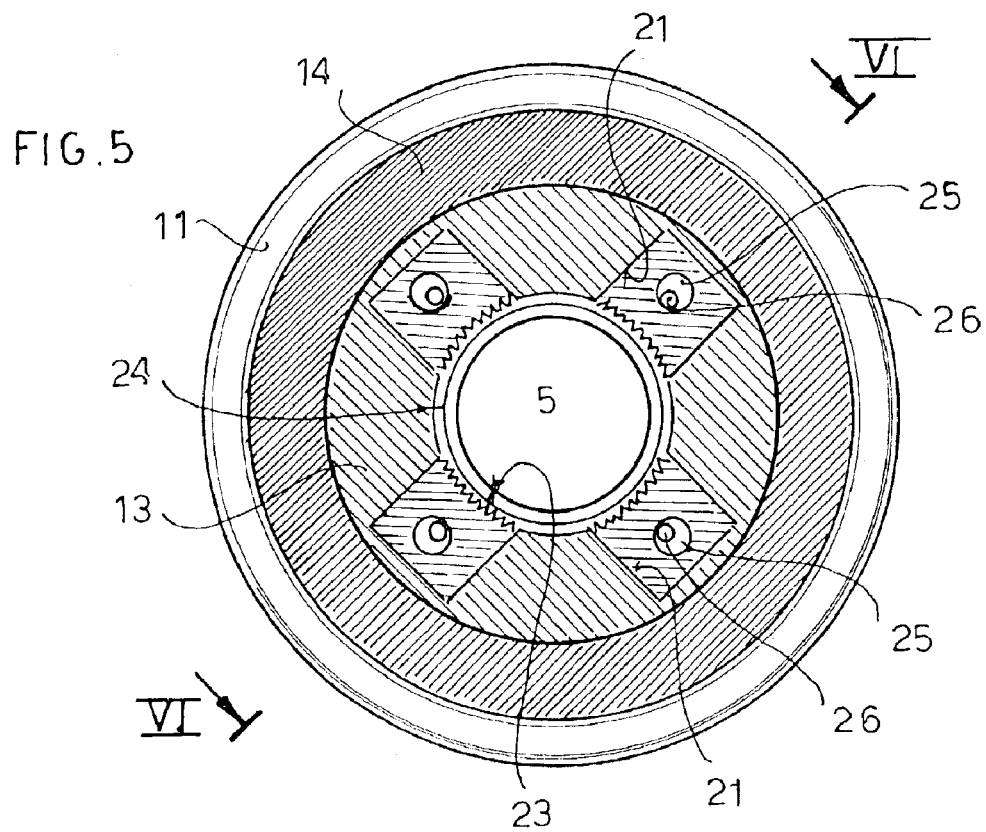
FIG. 5 is a cross sectional view along the sectional plane V—V of FIG. 4, illustrating four inserts of the closing and clamping system in the open, unclamped position, wherein the guide column has not been sectioned.

As shown in FIGS. 5 and 7, four parallelepiped or cylinder-shaped seats 21 open towards the outside at the rear and towards the inside radially are formed inside the body of the closing piston 13. Said seats 21 are disposed in diametrically opposite positions equidistant from one another. Inserted inside the seats 21 are respective inserts 22 shaped substantially as parallelepiped or cylindrical blocks and having a concave end 23 shaped as an arc of circumference, disposed towards the side surface of the guide column 5 and having a radius of curvature substantially similar to that of the guide column.

As shown in FIG. 6, on the end surface 23 of each insert 22 a serrated toothing is formed, suitable to engage in a locking relationship with a complementary toothing 24 formed circumferentially in a portion of the guide column 5.

Each insert 22 is mounted radially slidable in it own seat 21 and has a radial stroke of about 1.4–1.5 times the height of the teeth in its toothing 23. In this manner the locking inserts 22 can slide radially in the seats 21 of the piston 13 from a retracted releasing position (FIGS. 5 and 6) wherein the teeth 23 of the inserts do not engage the teeth 24 of the guide column 5 to an extracted locking position (FIGS. 7 and 8) wherein the teeth 23 of the inserts engage the teeth 24 of the guide column 5.

A closing plate 27 in the form of an annular flange disposed around the guide column 5 so as to close the inserts 22 inside their seats is fixed at the rear end of the piston 13. A through hole 25 with its axis parallel to the axis of the guide column 5 is formed in each insert 22. An eccentric shaft 26 having an eccentric axis with respect to the axis of the hole 25 is mounted inside said hole 25 of the insert. In this manner the surface that defines the hole 25 acts like a cam and the eccentric shaft 26 acts like a cam follower. Thus, a 180° rotation of the eccentric shaft 26 around its own axis causes a radial translation of the relative insert 22 within its own seat 21.

As shown in FIG. 6, each eccentric shaft 26 passes through a respective through hole of the closing plate 27 of the piston, so that its free end protrudes rearward from the closing plate 27, whilst the other end of the eccentric shaft is rotatably supported in the piston 13 beyond the insert 22. A pinion gear 28 is mounted integrally or force fitted in the free end of each eccentric shaft 26 behind the closing plate 27.

Figure 3:
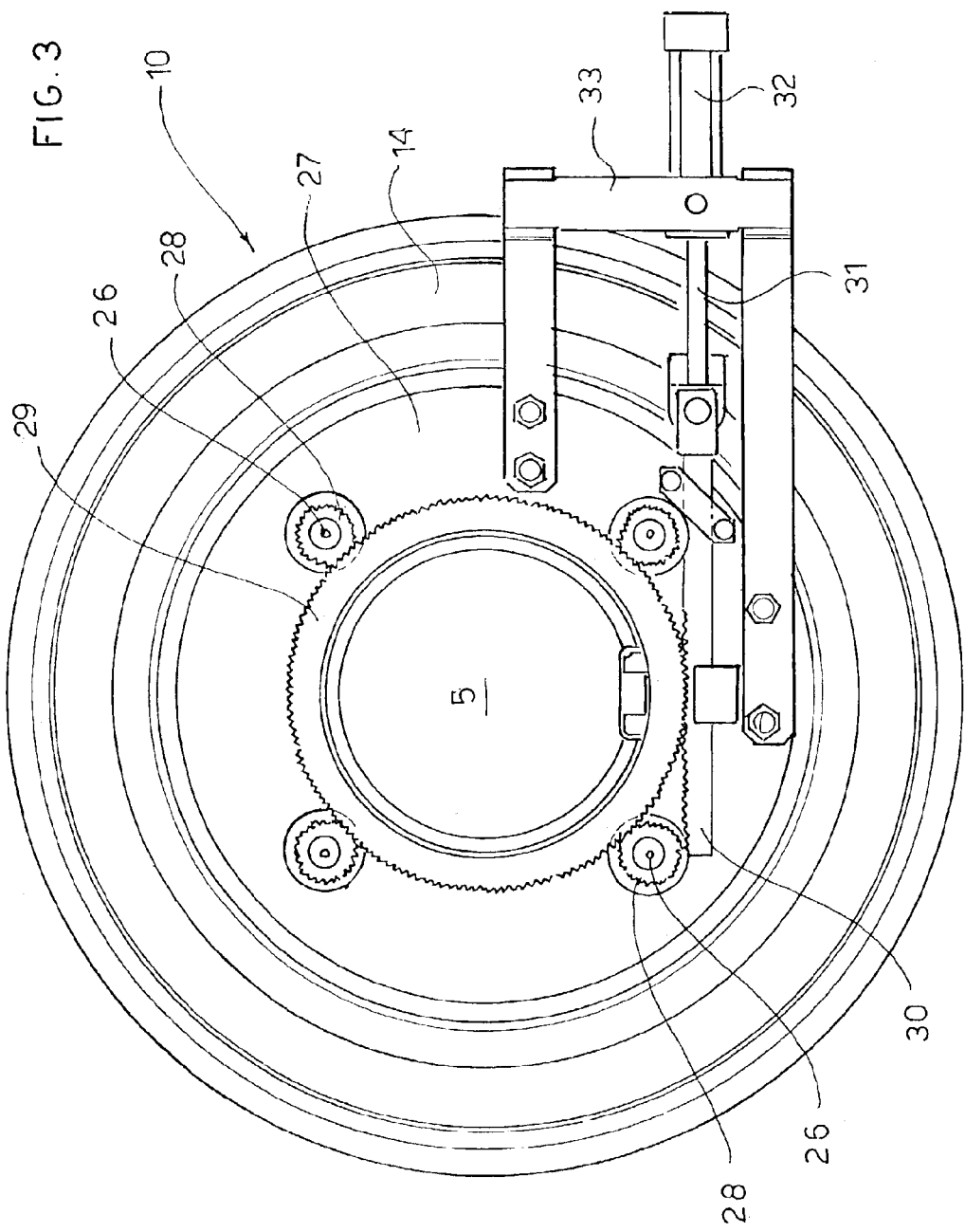
FIG. 3 is an enlargement of a detail of FIG. 2, illustrating a sun-and-planet motion mechanism of the closing and clamping system according to the invention.

As shown in FIG. 3, the axes of the four eccentric shafts 26 are disposed on the four corners of a square having its centre coinciding with the axis of the guide column 5. Thus, to drive the four pinion gears 28 of the respective eccentric shafts 26 in rotation and in synchronism, a sun—planet type of mechanism comprising a sun crown gear 29 which meshes with four planetary pinion gears 28 is employed.

The sun crown gear 29 is annular and is disposed behind the closing plate 27 of the piston and around the guide column 5. The sun crown gear 29 is mounted rotatably around an axis coinciding with the axis of the guide column 5. The sun crown gear 29 has an external toothing which meshes with the toothing of the four planetary pinion gears 28 of the eccentric shafts. The diameter of the sun crown gear 29 being much greater than the diameter of the planetary pinion gears 28, a rotation of a few degrees of the crown gear 29 is sufficient to allow a rotation of 180° of the planetary pinion gears 28.

The crown gear 29 is driven in rotation by means of a rack 30 which meshes with the teeth of the crown gear 29. The rack 30 is connected to the rod 31 of a piston of a linear actuator 32, such as for example a hydraulic or pneumatic cylinder, supported by a bracket 33 fixed to the closing plate 27 of the piston.

In this manner the linear actuator 32 imparts a translational movement to the rack 30 which meshes with the crown gear 29 causing a rotation of a few degrees. The rotation of the crown gear 29 causes a rotation of 180° of the pinions 28 integral with the eccentric shafts 26. As a result a rotation of 180° of the eccentric shafts 26 causes a translational movement of the locking inserts 22 which can pass from the non locking position to the locking position and vice versa.

As shown in FIG. 2, the closing and locking system 10 according to the invention comprises four sun crown gears 29, that is to say two lower crown gears 29 disposed around the two guide columns disposed in the bottom part of the machine and two upper crown gears 29 disposed around the guide columns of the top part of the machine.

To synchronise the locking/releasing movement of the inserts 22 on the four guide columns 5 of the machine, use is made of only two linear actuators 32, synchronised with each other and acting on the racks 30 which mesh with the lower sun crown gears 29. Thus the two lower crown gears 29 are connected to the respective upper crown gears 29 by means of two lateral tie rods 34. Each lateral tie rod 34 has at its ends two racks 30' which engage the lower crown gear 29 and the upper crown gear 29, respectively.

The two upper crown gears 29 also are connect to each other by an upper tie rod 34 which has two racks 30' that mesh with the upper crown gears.

Operation of the closing and clamping system 10 according to the invention is described hereunder.

When the machine 1 is in the open position (FIG. 1), in which the two mould halves 4 and 9 are spaced apart from each other, the closing and clamping system 10 is in the non clamping condition, that is to say (FIGS. 5 and 6), the teeth 23 of the locking inserts 22 are not engaged with the teeth 24 of the guide columns 5. In this situation, the moveable plate 8 is made to translate horizontally so as to cause the mould halves 4 and 9 to move toward each other and close.

At this point, the closing and clamping system 10 intervenes to lock the moveable plate 8 in position. Then, as shown in FIG. 2, the racks 30 which set in rotation the two lower crown gears 29 are operated by means of the linear actuators 32. The rotation of the two lower crown gears 29 also sets the two upper crown gears in rotation synchronously, by means of the tie rods 34 having rack-type ends 30'.

The simultaneous rotation of the four crown gears 29 causes a 180° rotation of the pinions 28 integral with the eccentric shafts 26. Consequently, the rotation of the eccentric shafts 26 causes a translational movement of the locking inserts 22 which pass from the non clamping position (FIGS. 5-6) to the clamping position (FIGS. 7 and 8) wherein the toothing 23 of the inserts engages with the toothing 24 of the guide columns 5.

In this situation of clamping, the locking chamber 15 of each cylinder 11 is pressurised. In this manner each piston 13 is pushed from left to right (FIG. 8) to allow a perfect mesh between the toothings 23 of the inserts and the toothings 24 of the guide columns. It should be noted that the seals of the hydraulic piston 13 are easier to form because they have to perform only the function of axial movement of the hydraulic piston 13 and not of rotary translational movement as in bayonet systems of the prior art.

Figure 8:
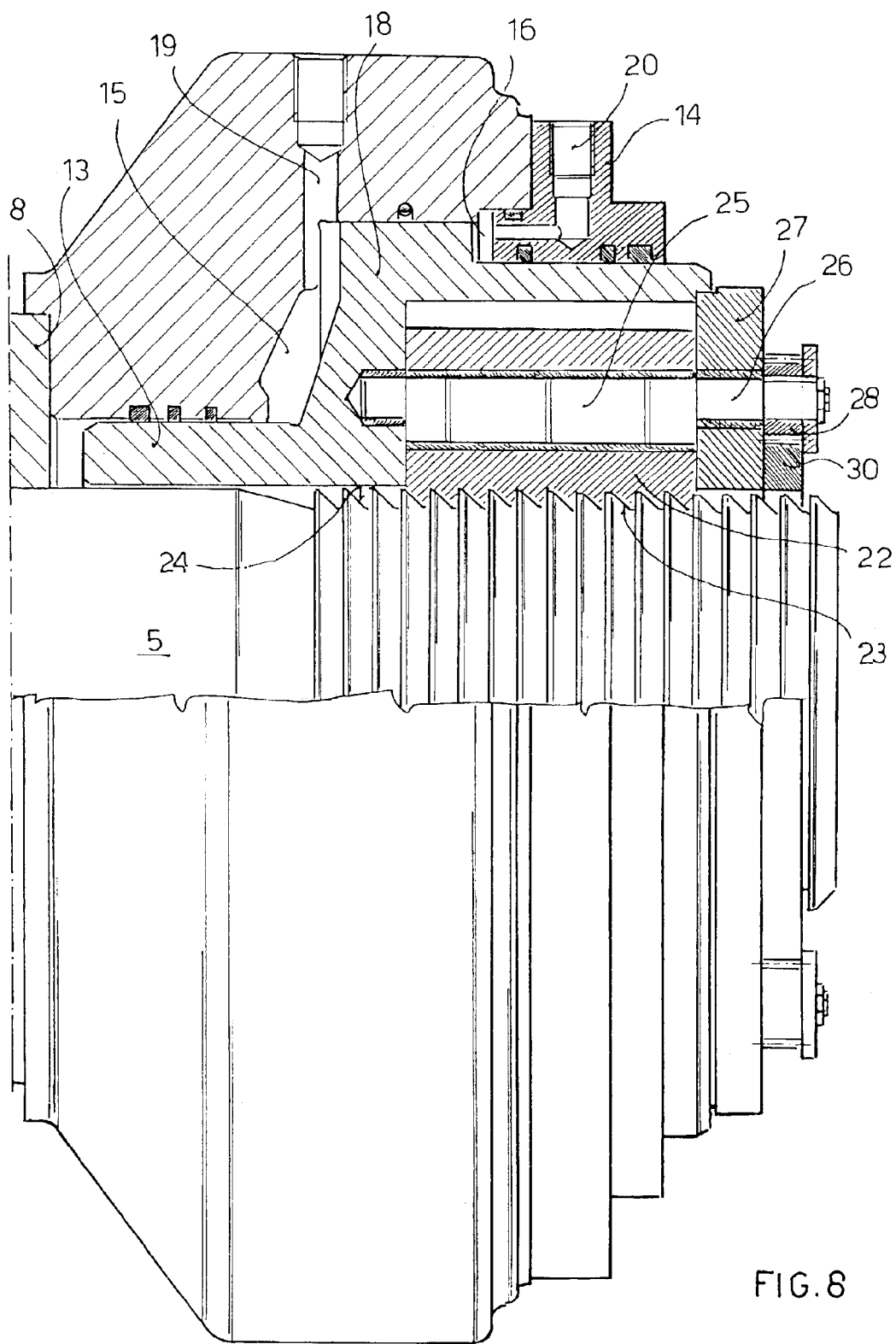
FIG. 8 is a view partially in axial section, taken along the sectional plane VIII—VIII of FIG. 7.

At this point the moveable plate 8 which is integral with the assembly formed by the cylinder 11, the piston 13 and the inserts 22 is locked in position and the plastic material can be injected into the mould cavity. The plastic material injected into mould tends to expand, imparting an expansion force which tends to move the moveable plate 8 from left to right (FIG. 8). However, thanks to the grip of the teeth 23 of the inserts on the teeth 24 of the guide columns, the moveable plate 8 remains fixed in position throughout the entire moulding process.

Once shaping of the moulded product inside the mould is completed, the locking chamber 15 of each cylinder is depressurised and the releasing chamber 16 of each cylinder is pressurised. In this manner disengagement of the teeth 23 of the inserts 22 from the teeth 24 of the guide columns 5 is obtained. Subsequently, by means of the linear actuators 32, the racks 30 which cause a rotation in the opposite direction of the of the crown gears 29 are operated. Accordingly the crown gears 29 cause a rotation of 180° of the pinions 28 integral with the eccentric shafts 26. As a result the rotation of the eccentric shafts 26 causes translation of the inserts 22 into the releasing position illustrated in FIGS. 5 and 6. At this point the moveable plate 8 is made to translate so as to open the mould for ejection of the moulded item.

Numerous variations and modifications of detail within the reach of a person skilled in the art can be made to the present embodiment of the invention without departing from the scope of the invention set forth in the appended claims.

What is claimed is:

1. A closing and clamping system (10) for an injection molding machine (1), the machine comprising a fixed mold half (4) mounted on a fixed plate (3) integral with a machine frame (2) and a moveable mold half (9) mounted on a moveable plate (8) supported in translation on the machine frame (2) and guided along guide columns (5) integral with the fixed plate (3), to pass from a mold closing position, wherein the two mold halves (4, 9) are coupled together defining a cavity for injection of the plastic material, to a mold opening position, wherein the two mold halves (4, 9) are spaced apart from each other to allow ejection of the molded product, the closing and clamping system (10) comprising clamping means, integral with said moveable plate (8) and acting on a portion of said guide columns (5) to lock the moveable plate (8) in position, when it is in the mold closing position, characterised in that said clamping means comprise a plurality of locking inserts (22) mounted slidably in seats (21) of a body (13) integral with said moveable plate (8) to pass from a non clamping position to a clamping position in which they act, in a locking relationship, on said guide columns (5), each locking insert (22) having a circular hole (25) to receive an eccentric shaft (26) in an eccentric position, so that the rotation of said eccentric shaft (26) causes the translational movement of said insert (22), drive means being provided such as to set said eccentric shafts (26) in rotation synchronously, to allow opening/closing of said clamping means.

2. A closing and clamping system (10) according to claim 1, characterised in that said inserts (22) are four in number for each guide column (5) and are disposed in diametrically opposite positions with respect to the axis of the guide column (5) to act in opposition on diametrically opposite circular sectors of the guide column (5).

3. A closing and clamping system (10) according to claim 1, characterised in that each of said inserts (22) has at one end thereof a toothing (23) able to engage in a clamping relationship with a matching toothing (24) provided circumferentially on a portion of each guide column (5).

4. A closing and clamping system (10) according to claim 1, characterised in that said seats (21) of said inserts (22) are formed in the body of pistons (13) mounted axially slidably inside respective cylinders (11) integral with said moveable plate (8), each piston (13) having an axial cavity, to be able to be disposed around a respective guide column (5).

5. A closing and clamping system (10) according to claim 4, characterised in that said piston (13) comprises a part with a greater diameter (18) so as to define within the cylinder (11) a locking chamber (15) forward of said larger diameter part (18) and a releasing chamber (16) rearward of said larger diameter part (18), able to be pressurised by means of pressurisation fluid to allow clamping and unclamping of said clamping means.

6. A closing and clamping system (10) according to claim 1, characterised in that said drive means of the eccentric shafts (26) operating the locking inserts (22) comprise a sun-and-planet movement mechanism.

7. A closing and locking system (10) according to claim 6, characterised in that mounted integrally at the free end of each eccentric shaft (26) there is a planetary pinion gear (28) which meshes on the periphery of a sun crown gear (29) mounted rotatably around each guide column (5).

8. A closing and clamping system (10) according to claim 7, characterised in that said sun wheel (29) is driven in rotation by means of a rack (30) translating with linear motion.

9. A closing and clamping system (10) according to claim 8, characterised in that at least one rack (30) acting on at least one respective sun crown gear (29) is driven in translation by means of at least one linear actuator (32).

10. A closing and clamping system (10) according to claims 7, characterised in that said sun crown gears (29) are connected to each other by means of tie rods (34) bearing at their ends racks (30') that mesh on said crown gears.

* * * * *